UNITED STATES PATENT OFFICE.

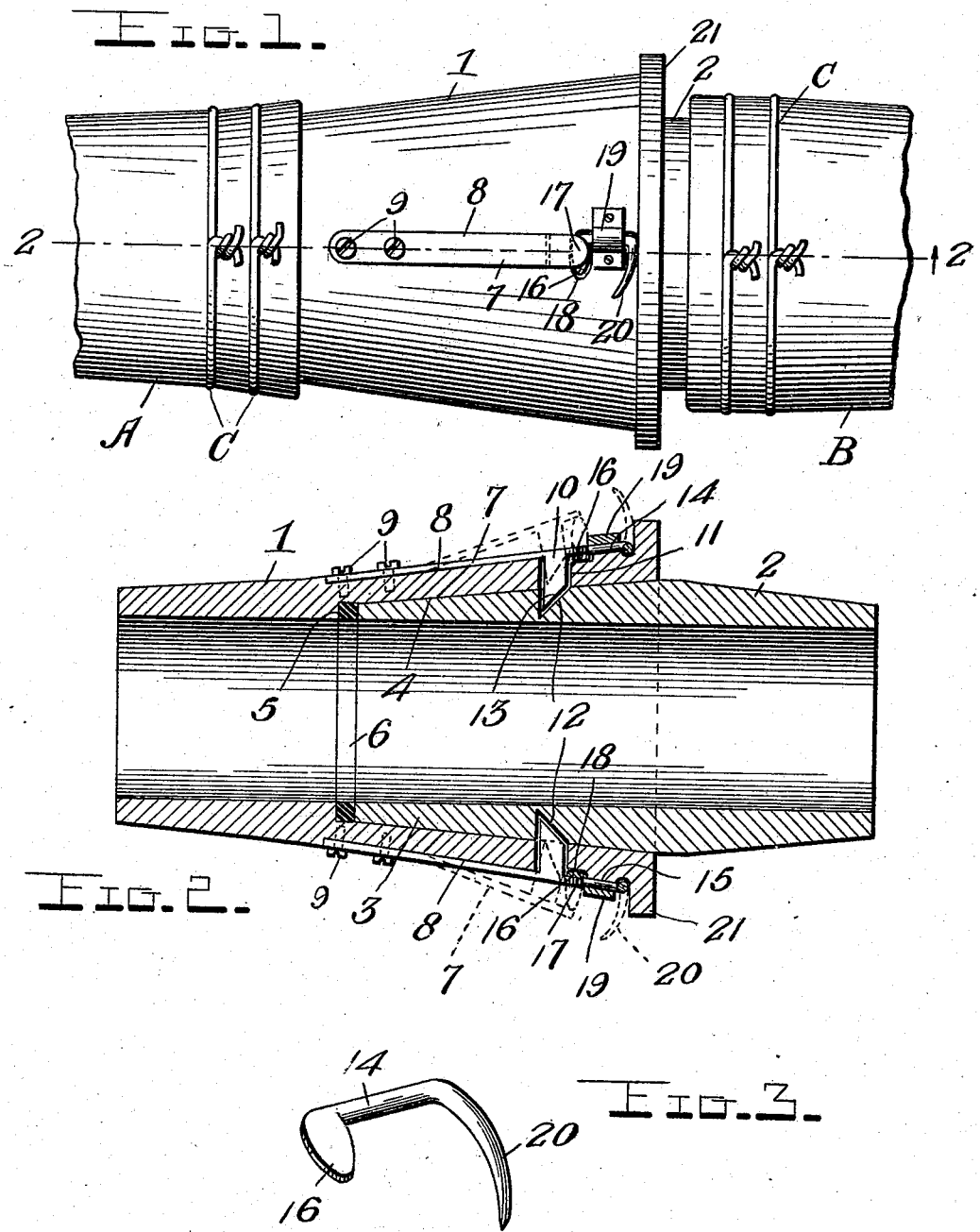

HAZARD HALSTEAD AND LAURENCE NIKSCH, OF HOBART, INDIANA.

HOSE-COUPLING.

937,437.

Specification of Letters Patent.

Patented Oct. 19, 1909.

Application filed March 12, 1909. Serial No. 482,990.

*To all whom it may concern:*

Be it known that we, HAZARD HALSTEAD and LAURENCE NIKSCH, citizens of the United States, residing at Hobart, in the county of Lake and State of Indiana, have invented certain new and useful Improvements in Hose-Couplings, of which the following is a specification, reference being had to the accompanying drawings.

This invention relates to improvements in hose couplings of that class which may be quickly and easily connected and disconnected.

The object of the invention is to provide a simple and practical coupling of this character which may be used upon various kinds of hose, pipes and the like and which has an improved catch for effectively retaining the members in coupled position but at the same time will enable them to be quickly unfastened.

With the above and other objects in view, the invention consists of the novel features of construction and the combination and arrangement of parts hereinafter fully described and claimed, and illustrated in the accompanying drawings, in which—

Figure 1 is a side elevation of the improved hose coupling; Fig. 2 is a longitudinal section taken on the plane indicated by the line 2—2 in Fig. 1, the hose sections being removed from the coupling members; and Fig. 3 is a detail perspective view of one of the rock shafts for retracting the spring catches.

In the drawings 1 and 2 denote the two separable members of the coupling having their outer ends suitably shaped to receive hose sections, pipes or the like A, B. As illustrated in Fig. 1, the parts A, B are in the form of rubber hose and are secured by wires C, but it will be understood that they may be otherwise fastened to the coupling members 1, 2. The outer end of the inner member 2 is tapered or cone-shaped, as shown at 3, to enter a similar or cone-shaped socket 4 formed in the enlarged outer end of the other member 1. The socket 4 forms in the bore of the member 1 an annular shoulder 5 for the reception of a packing ring 6 against which the end of the member 2 abuts for the purpose of effecting a water, gas or other fluid tight joint between the two members, as will be readily seen upon reference to Fig. 2 of the drawings. For the purpose of retaining the members in engaged or coupled position, one or more spring catches 7 is provided. As illustrated, the coupling has two of said catches 7 and they are arranged at diametrically opposite points upon the member 1. Each of the catches is in the form of a leaf spring set in a longitudinal groove or recess 8 and secured therein at one end by screws 9. Formed upon the catch springs 7, adjacent their free ends are inwardly projecting lugs 10 which extend through transverse openings 11 in the member 1 and into an annular groove 12 formed in the member 2, as clearly shown in Fig. 2 of the drawings. The resiliency of the spring catches 7 causes the lugs or dogs 10 to be maintained in operative or normal position, shown in full lines in Fig. 2 of the drawings, and to permit the two members to be coupled without manually retracting the catches or dogs, the inner extremities of said dogs 10 are beveled inwardly, as shown at 13. For the purpose of retracting the catches or dogs to permit the members to be uncoupled or separated, short rock shafts 12 are arranged in bearing grooves 15 in the member 1 and have right angularly bent ends or arms 16 which lie beneath the free extremities 17 of the catch springs 7 and are adapted to lift or retract said catches when the shafts 14 are rocked from full line to dotted line position shown in Fig. 2. The shafts 14 are disposed longitudinally so that the crank or cam arms 16 at their inner ends extend transversely and are normally disposed beneath the ends 17 of the catch springs in grooves 18 formed in the member 1, as clearly shown in Figs. 1 and 2. The rock shafts 14 are retained in the bearing grooves 15 by bearing plates 19. The outer ends of the rock shafts 14 are bent angularly and curved longitudinally to provide finger pieces 20 which project out of the grooves 15 and rest normally upon the outer surface of the member 1, whereby they may be readily engaged with the finger and lifted to retract the catches. Formed integral with the outer end of the member 1 is an annular radially projecting guard flange 21 which serves to protect the catches and their retracting means.

In operation, it will be seen that when it is desired to connect and lock the two members of the coupling it is only necessary to force the member 2 into the member 1, whereupon the dogs or projections 10 of the catch springs 7 will spring into the groove 12 of the member 2 and engage an annular shoulder on the latter formed by one wall of said groove. When it is desired to disconnect the coupling members it is only necessary to engage the finger pieces 20 of the rock shafts 14 and swing the same outwardly at right angles to the member 1, whereupon the crank or cam ends 16 of said rock shafts will lift the catch springs 7 and retract the dogs or projections 10 from the groove 12 in the member 2.

Having thus described the invention what is claimed is:

The hereindescribed hose coupling comprising two members, an inner one having an outwardly tapered end formed with an annular groove of V-shape in cross section and an outer member having a cone-shaped socket to receive the tapered end of the inner member, said socket having an annular shoulder at its bottom and said member having at its outer end an annular radially projecting guard flange the outer face of said outer member being formed at opposite points with recesses, said outer member also having at opposite points transverse openings arranged in said recesses and adapted to register with the annular groove in the inner member, longitudinally arranged leaf springs arranged in the recesses of the outer member and having their inner ends secured therein, V-shaped dogs projecting from the inner faces of said springs adjacent their outer ends and adapted to extend through said transverse openings in the outer member and into the groove in the inner member, a packing ring arranged on the shoulder in the socket of the outer member, transverse bearing plates arranged over portions of the recesses in the outer member, and longitudinally extending rock shafts 14 arranged beneath said bearing plates and retained by the latter in the recesses of said outer member, the inner ends of said rock shafts being formed with transversely extending cam arms 16 disposed under the free or outer ends of said springs and adapted to lift the latter to retract the dogs from the groove in the inner member and the outer ends of said rock shafts being formed with transversely extending curved finger pieces 20 lying close to the guard flange on said outer member.

In testimony whereof we hereunto affix our signatures in the presence of two witnesses.

HAZARD HALSTEAD.
LAURENCE NIKSCH.

Witnesses:
  EDWARD O. MAINS,
  OMER THEAKER.